US010721908B2

(12) United States Patent
Lindvall

(10) Patent No.: US 10,721,908 B2
(45) Date of Patent: Jul. 28, 2020

(54) MAT FOR A LIVESTOCK FACILITY FLOOR, A FLOOR, AND A LIVESTOCK FACILITY

(71) Applicant: LINDVALLS PATENTBOLAG AB, Visby (SE)

(72) Inventor: Tommy Lindvall, Visby (SE)

(73) Assignee: LINDVALLS PATENTBOLAG AB, Visby (SE)

( * ) Notice: Subject to any disclaimer, the term of this patent is extended or adjusted under 35 U.S.C. 154(b) by 8 days.

(21) Appl. No.: 15/741,626

(22) PCT Filed: Jun. 28, 2016

(86) PCT No.: PCT/SE2016/050653
§ 371 (c)(1),
(2) Date: Jan. 3, 2018

(87) PCT Pub. No.: WO2017/007402
PCT Pub. Date: Jan. 12, 2017

(65) Prior Publication Data
US 2018/0192612 A1    Jul. 12, 2018

(30) Foreign Application Priority Data

Jul. 8, 2015 (SE) ...................... 1550993

(51) Int. Cl.
*A01K 1/015* (2006.01)
*A01K 1/01* (2006.01)
*B32B 3/30* (2006.01)

(52) U.S. Cl.
CPC ............ *A01K 1/0157* (2013.01); *A01K 1/015* (2013.01); *A01K 1/0135* (2013.01); *B32B 3/30* (2013.01);

(Continued)

(58) Field of Classification Search
CPC .... A01K 1/015; A01K 1/0157; A01K 1/0117; A01K 1/0135; A01K 15/027
See application file for complete search history.

(56) References Cited

U.S. PATENT DOCUMENTS 348,782 A * 9/1886 Sawyer .................. E04F 15/10
1,177,695 A   4/1916 Gable
(Continued)

FOREIGN PATENT DOCUMENTS

EP   1466651 A1   10/2004
FR   2488487      2/1982
(Continued)

OTHER PUBLICATIONS

International Search Report and Written Opinion regarding PCT/SE2012/051046, dated Jan. 4, 2013, 11 pages.
(Continued)

*Primary Examiner* — Thanh Pham
(74) *Attorney, Agent, or Firm* — Foley & Lardner LLP

(57) ABSTRACT

Mat (12) for a floor (11) for livestock facilities, which floor (11) is formed with a defined longitudinal direction, the mat (12) comprising a liquid-impermeable support layer (121) onto which a wear layer (122) is applied and which support layer (121) can be imposed an intermittent bending to essentially be able to connect against a cylindrical object having the diameter of Ø=2Ro, and which mat (12) is provided with first slip-reducing means (502, 602, 702, 802, 902), wherein the bending primarily is located to straight and parallel lines, grooves, or bands extending transversely to the mat in or on the wear layer (122), and that the bending in these lines, grooves, or bands amounts to 1/r, wherein Ro≥r. Also concerns a floor having such a mat and a livestock facility having such a floor.

9 Claims, 3 Drawing Sheets

(52) U.S. Cl.
CPC . *B32B 2307/7265* (2013.01); *B32B 2307/744* (2013.01); *B32B 2471/04* (2013.01)

(56) References Cited

U.S. PATENT DOCUMENTS

| | | | |
|---|---|---|---|
| 3,274,973 | A | 9/1966 | Woods et al. |
| 3,694,068 | A | 9/1972 | Jordan |
| 3,793,988 | A | 2/1974 | Traeger |
| 4,047,452 | A | 9/1977 | Eddy |
| 4,974,831 | A | 12/1990 | Dunham |
| 4,984,810 | A | 1/1991 | Stearns et al. |
| 5,184,988 | A | 2/1993 | Dunham |
| 5,596,949 | A | 1/1997 | Fanguy |
| 5,816,190 | A * | 10/1998 | van der Lely ........ A01J 5/0175 119/14.08 |
| 5,989,695 | A * | 11/1999 | Fuller .................. A01K 1/0157 428/175 |
| 6,237,536 | B1 | 5/2001 | Lindvall et al. |
| 7,051,680 | B2 | 5/2006 | Lindvall |
| 7,287,641 | B2 | 10/2007 | Lindvall |
| 7,507,187 | B2 | 3/2009 | Dyer |
| 9,010,275 | B2 | 4/2015 | Lindvall |
| 2014/0076358 | A1 * | 3/2014 | Irwin .................... E03D 13/005 134/6 |
| 2015/0191311 | A1 * | 7/2015 | Costanzo ............... B65G 17/24 198/348 |

FOREIGN PATENT DOCUMENTS

| | | |
|---|---|---|
| FR | 2488487 A1 | 2/1982 |
| KR | 20120063379 A | 6/2012 |
| SU | 1655401 | 6/1991 |
| WO | WO 96/09756 A1 | 4/1996 |
| WO | WO 2010/057238 A2 | 5/2010 |
| WO | WO 2010/078158 A1 | 7/2010 |

OTHER PUBLICATIONS

International Search Report and Written Opinion regarding International Appl. No. PCT/SE2016/050653, dated Sep. 12, 2016, 10 pps.

Extended European Search Report regarding corresponding EP Pat. App. No. 16821735.4, dated Feb. 11, 2019, 8 pps.

English translation of Russian search report regarding Application No. 2018102359, completed on May 29, 2019, 2 pps.

* cited by examiner

MAT FOR A LIVESTOCK FACILITY FLOOR, A FLOOR, AND A LIVESTOCK FACILITY

TECHNICAL FIELD

The present invention relates to floors intended for livestock facilities. One type of said floors comprises a, preferably endless, mat, which is intermittently driven in a direction for, for instance, removal of dung from the floor and supply of bedding and/or animal fodder onto the same.

BACKGROUND OF THE INVENTION

Background of the invention is seen, among others, in the Swedish patent application SE 9604750-1 having the publication number SE 508770, corresponding to U.S. Pat. No. 6,237,536. This publication shows an animal box having a floor in the form of an endless belt, which is intermittently movable in the longitudinal direction of the box, an operating device, and a driving device for the operating device.

Such floors tend to become slippery and therefore the animals setting foot upon the floor may slip and hurt themselves. Thus, such ones have to be anti-slip. Furthermore, such floors have to be of high tensile-strength and resistant to wear.

Particularly in the breeding of pigs, a hard-wearing floor has to be used, but these floors can from experience not be produced as a liquid-impervious mat since experiments with such mats have shown that the mat is bit in pieces. Therefore, such mats have previously been manufactured from rigid floor elements, which have been coupled together by a form of joint to be possible to be bent around a drive roller with the problem that the tightness has been lost. Such constructions are also complicated to manufacture, assemble/disassemble, and maintain.

Other durable flexible materials have been tested but turned out to be too slippery to constitute a satisfactory alternative. Even if these durable materials have been provided with a roughened surface to form a slip elimination, the slip problems have remained.

THE OBJECT OF THE INVENTION

The object of the present invention is to provide a floor for livestock facilities, which solves the previous problems which have existed, particularly resistance problems and slip problems in connection with floors for pig breeding.

The object is to provide a mat for a floor, which is more wear resistant than previously known floors but which simultaneously in certain portions or along lines may obtain a specific bending.

The object is furthermore to provide such a floor for livestock facilities that is provided with slip-reducing means.

The object is furthermore to provide such a floor that in addition is tight to prevent liquids from penetrating through the floor.

In addition, the object is to provide a livestock facility comprising such a floor.

SUMMARY OF THE INVENTION

By the present invention, such as this is seen in the independent claims, the above-mentioned objects are met, wherein said disadvantages have been eliminated. Suitable embodiments of the invention are defined in the dependent claims.

The invention concerns a mat for a floor for livestock facilities, which floor is formed with a defined longitudinal direction, the mat comprising a liquid-impermeable support layer onto which a wear layer is applied. The support layer can be imposed an intermittent bending, which means that the mat from a flat state is imposed a bending so as to then reassume a flat state and so on. The curving takes place for the mat to essentially connect against a cylindrical object having the diameter of $\emptyset=2R_o$. The mat is furthermore provided with a wear layer, which is situated on the opposite side of the support layer and comprises slip-reducing means. The bending of the mat is primarily located to straight and parallel lines or bands in or on the mat and in these lines or bands, the bending amounts to $1/r$, wherein $R_o \geq r$. By the invention, the floor surface can be provided with different types of slip-reducing means among which one type is protuberances placed on the surface of the mat in an optional pattern, but which pattern gives an indication of bending lines, bending grooves, or bending bands, which facilitate the bending in contrast to areas by the side of these lines or bands where the bending is almost non-existent. Another type of slip-reducing means consists of a coarse-grained structure as a limited layer in the upper surface of the wear layer and/or of the support layer or as a coarse-grained structure all through the material of the wear layer and/or the support layer. By these bending lines, bending grooves, or bending bands, a mat can be manufactured using a rigid and wear resistant material as wear layer but still be flexible in certain areas of said support layer. The strong material may in this connection be formed with said slip-reducing means of selected shapes and arranged in patterns to be maximally slip-reducing. According to the invention, also the bending of the mat may vary from a maximum at said bending lines, bending grooves, or bending bands to a minimum halfway between the same. A minimum of the bending corresponds to a radius of the mat wherein $R_m=\infty$, which implies straight portions between the bending lines, the bending grooves, or the bending bands.

As support layer, experiments have been made with HDPE in a thickness of 1.73 mm with a density of 0.957 g/cm³, which material has turned out to work well for a floor according to the invention and which floor also has been tested for pigs.

As wear layer, in these experiments a plastic mix called thermoplastic polyolefin, TPO, has been used, which is a heated plastic compound which obtains properties corresponding to rubber. TPO is a form of TPE mix which stands for "thermoplastic elastomers". TPO is characterized in that it has an oil base and is often called polymer alloy. TPO is generally harder than thermoplastic elastomers, TPE. In TPO, different plastics, such as polyethylene, PE, and, polypropylene, PP, may be mixed. In these experiments, both virgin and recycled PP were mixed in. The thickness of the wear layer was 0.28 mm.

Preferably, a structure is provided on the mat by rolling according to any one of the following two methods:

a) PE-AR (anti-slip) co-extruded layers with the same fragmentation of the individual layers. This method affords an anti-slip structure solely on the upper surface. A PE layer with a top layer that is co-extruded and in that connection is fed through a profile where the layers are pressed together. The material compositions are of the above-mentioned kinds.

b) PE-TPE mono-extruded layer having anti-slip properties all through the thickness. The layers are created by heating the plastic mix and then pressing it through a mould.

Thus, the mat may be produced either with a wear layer having anti-slip material or throughout with anti-slip material. The total thickness of the mat will be in the interval of 2.5-10 mm, preferably 2.5-3.5 mm.

Textures on the mat in the form of the pattern of the wear layer is preferably created by rolling the material under heating.

In one embodiment of the invention, said lines, grooves, or bands are oriented perpendicular to the longitudinal direction of the floor.

In one embodiment of the invention, $R_m > r$. This means, among other things, that the portions between the bending lines, the bending grooves, or the bending bands may be entirely flat, while in the bending lines, in the bending grooves, or in the bending bands, the bending is greater to compensate the flat portions so that the total bending along the enclosure of the entire cylindrical object will be equal to $1/R_o$.

In one embodiment of the invention, said lines are formed as grooves in the floor. Since the lines are straight over the entire mat, these lines facilitate cleaning of the mat, for instance using a rotary brush or by a flushing nozzle for water.

In one embodiment of the invention, the wear layer is provided with second slip-reducing means, between which means said lines, grooves, or bands can be identified. Such second slip-reducing means consist of elevations in/on the upper surface of the wear layer. Said second slip-reducing means are preferably combined with first slip-reducing means in the form of said coarse-grained structure of the surface of the wear layer.

In one embodiment of the invention, said lines are indicated as material reductions of the slip-reducing means on the mat. This embodiment means that repetitive patterns of slip-reducing means can be created on the upper surface of the wear layer or support layer, preferably by rolling.

In one embodiment of the invention, the slip-reducing means consist of elevations on the wear layer of the mat.

In one embodiment of the invention, the slip-reducing means are shaped according to a repeating pattern.

In one embodiment of the invention, the repeating pattern consists of elongate elevations, which are alternately oriented at 45° angles in relation to the longitudinal direction of the mat. This means that a sliding of the extremity of an animal can be limited to a smaller surface of the floor, which surface is located between the elevations.

In one embodiment of the invention, the wear layer of the mat is provided with a slip-reducing structure. This structure is a surface structure that is situated between the mentioned elevations in order to further limit sliding of the extremities across the surface.

In one embodiment of the invention, the mat is endlessly formed and provided with a driving means for a continuous or intermittent driving of the mat in the longitudinal direction thereof. The mat is endlessly formed and extends around a cylindrical drive roller driven by a driving means for a continuous or intermittent driving of the mat in the longitudinal direction thereof. In this embodiment, the mat is used in a floor for livestock facilities.

The invention also concerns a livestock facility, which comprises a floor according to any one of the mentioned embodiments.

In one embodiment of the invention, the livestock facility comprises a cylindrical object in the form of a drive roller against which the bottom layer of the mat abuts and which drive roller is arranged to be rotated continuously or intermittently by a driving means for the operation of the floor in the longitudinal direction thereof.

In one embodiment of the invention, the drive roller is oriented perpendicular to the longitudinal direction of the floor.

In one embodiment of the invention, the drive roller is provided with an outer friction layer, which increases the friction between the drive roller and the mat.

BRIEF DESCRIPTION OF THE DRAWINGS

Now, the invention will be described in more detail, references being made in connection with the accompanying drawing figures. The drawing figures show only explanatory sketches intended to facilitate the understanding of the invention.

DESCRIPTION OF THE INVENTION

Figure 1:
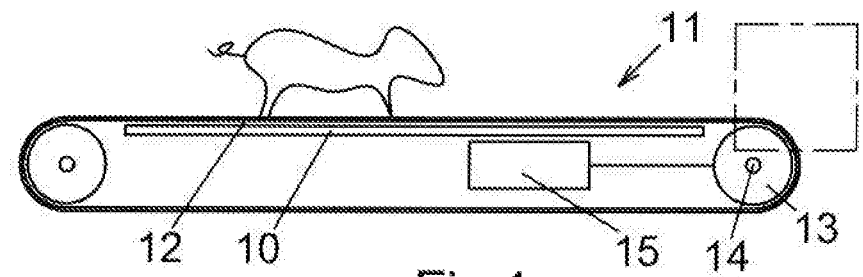
FIG. 1 shows a driven floor for livestock facilities according to the invention.

FIG. 1 shows a floor 11 for a livestock facility. The floor comprises an endless mat 12, which is continuously or intermittently driven in a direction to transport away animal dung and possibly also to supply bedding to the floor. To the floor, different scraping means or brushing means may be connected to clean the mat, however, these means are not shown in the figures. Also cleaning by water or air may be used. In addition, there is support means 10 which supports the mat 12 to avoid deflection from the weight of one or more animals along the extension of the mat. One end of the floor 11 is provided with a drive roller 13 inside the mat, which drive roller drives the mat by friction against the drive roller. The drive roller is mounted for rotation on a centre shaft 14. The drive roller is driven by a driving means 15, which may be an electric motor connected to the drive roller 13 in a suitable way. Also other ways to drive the drive roller are possible.

In the figure, an area has been marked, which will be shown in different embodiments and described in connection with the accompanying figures.

Figure 2:
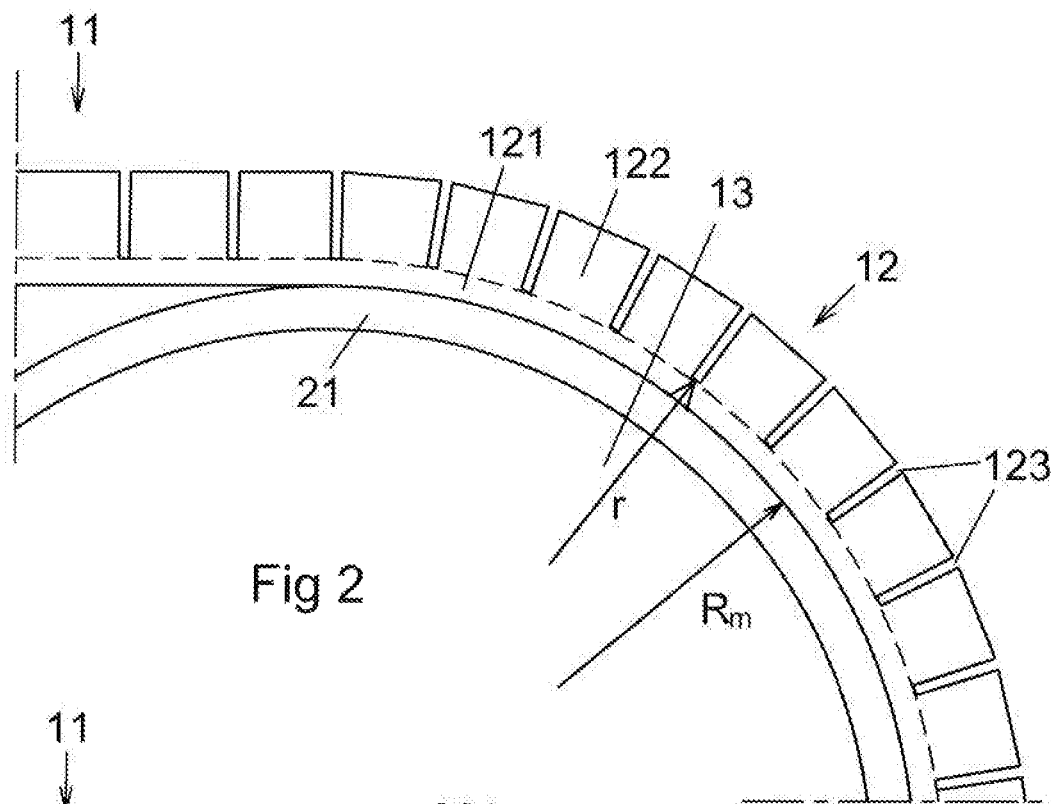
FIG. 2 shows an enlargement according to FIG. 1 of a first embodiment according to the invention.

FIG. 2 shows in a first embodiment the floor 11 as the horizontal part of the endless mat 12, which abuts against the drive roller 13, which is provided with an outer friction layer 21 to avoid sliding between the mat and the drive roller. The mat 12 is constructed from at least one support layer 121 and one wear layer 122. These layers may be integrated with each other and be of the same material or be moulded together from two or more material layers of different materials having different properties, wherein the properties of the support layer 121 consist in higher tensile strength and lower elasticity, whereas the properties of the wear layer 122 consist in higher elasticity and slip-reducing structure at least in the surface layer thereof. Common to all embodiments is, however, that the mat comprises an inner high tensile-strength layer corresponding to the support layer 121 and an outer wear resistant layer corresponding to the wear layer 122. The embodiment according to the figure shows that the wear layer 122 is provided with essentially straight slits 123 or areas, which are oriented parallel to the centre shaft of the drive roller 13 and extend across the entire mat 12. These slits or areas possess a lower flexural stiffness than the rest of the mat and in such a way a radius of bending r is obtained in said slits or areas that is shorter than the radius of bending $R_m$ of the rest of the mat 12, i.e., $r<R_m$.

Figure 3:
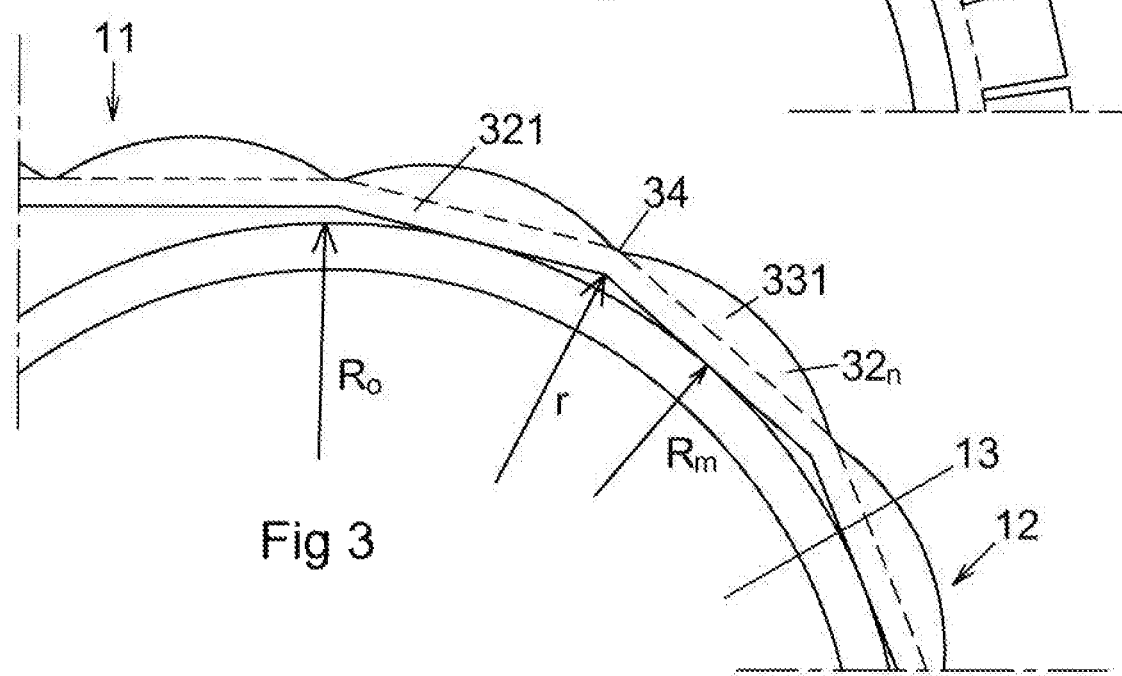
FIG. 3 shows an enlargement according to FIG. 1 of a second embodiment according to the invention.

FIG. 3 shows a second embodiment of a floor 11 having a mat 12 according to the invention. The mat in this embodiment is constructed from a support layer 321 and a wear layer 331, which wear layer consists of a number of elevations $32n$ each one of which has a length extension and an orientation across the mat according to a certain pattern. However, the pattern is formed with lines or bands 34, which are essentially straight and oriented parallel to the centre shaft of the drive roller 13 and extend across the entire mat 12. The figure shows that the radius of the object/drive roller $Ro \leq R_m$.

Correspondingly as has been shown in the first embodiment, these lines or bands 34 possess a lower flexural stiffness than the rest of the mat and in such a way, a radius of bending r is obtained in said slits or areas that is shorter than the radius of bending $R_m$ of the rest of the mat 12, i.e., $r<R_m$. To make this clear, the bendings have been exaggerated in the figure, the longer radius of bending, $R_m$, having been made so long that the mat is almost flat between the lines or bands 34.

Figure 4:
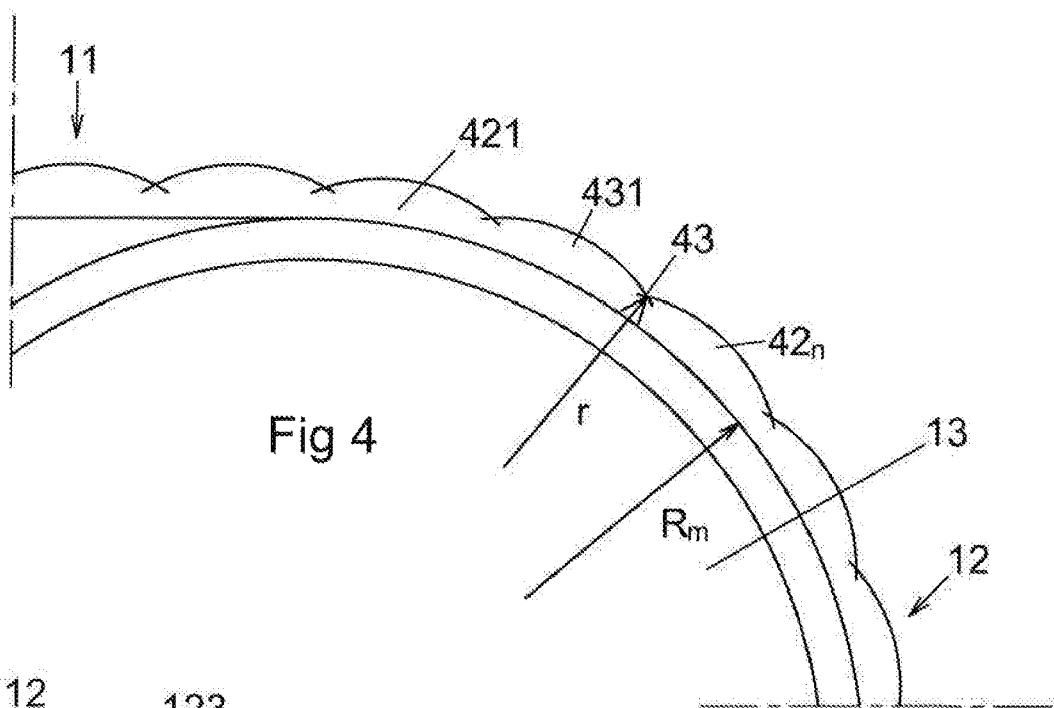
FIG. 4 shows an enlargement according to FIG. 1 of a third embodiment according to the invention.

FIG. 4 shows a third embodiment of a floor 11 having a mat 12 according to the invention. The mat in this embodiment is constructed from a support layer 421 and a wear layer 431, which wear layer consists of a number of elevations $42_n$ each one of which consists of circular caps the patterns of which across the surface of the mat overlap each other a bit along parallel lines 43. The overlapping is illustrated in the figure by the intersecting lines between the elevations. The parallel lines 43 are essentially straight and oriented parallel to the centre shaft of the drive roller 13 and extend across the entire mat 12. Also in this embodiment, these lines 43 possess a lower flexural stiffness than the rest of the mat and in such a way a radius of bending r is obtained in these lines 43 that is shorter than the radius of bending $R_m$ of the rest of the mat 12, i.e., $r<R_m$.

Figure 5:
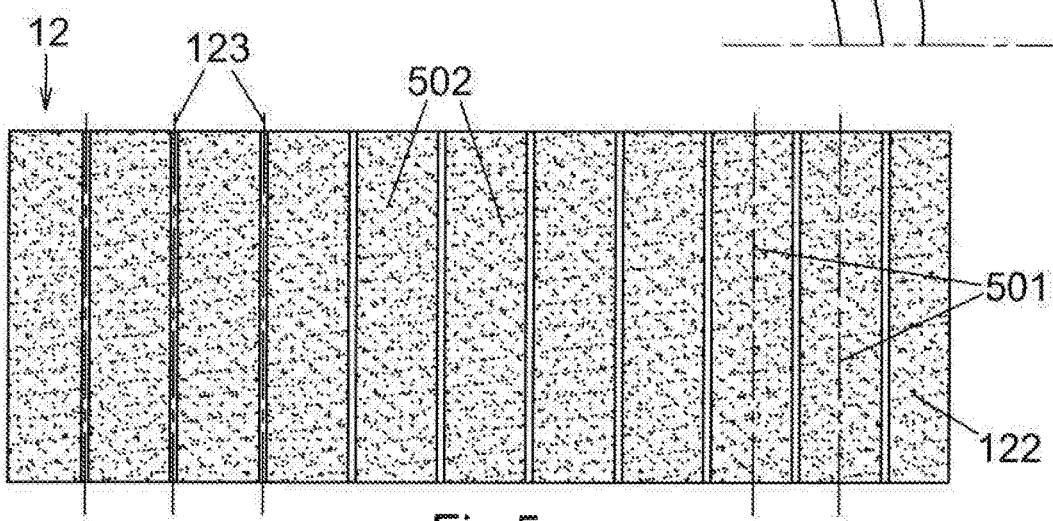
FIG. 5 shows a part of a mat according to the embodiment in FIG. 2.

FIG. 5 shows a mat 12 according to FIG. 2 with the slits 123 in which the greater bending of the mat takes place in the rolling of the mat over the drive roller. Halfway between these slits, the bending is the smallest and is shown in the figure by the dash-dotted lines 501. The wear layer 122 is provided with first slip-reducing means 502 across a major part of the surface of the wear layer in the form of a coarse-grained structure in the surface. These first slip-reducing means 502 are of a higher hardness than the rest of the wear layer and may consist of carbides in the wear layer to obtain slip reduction also in a worn down wear layer. Said first slip-reducing means may alternatively be formed as a patterned structure in the surface of the wear layer.

Figure 6:
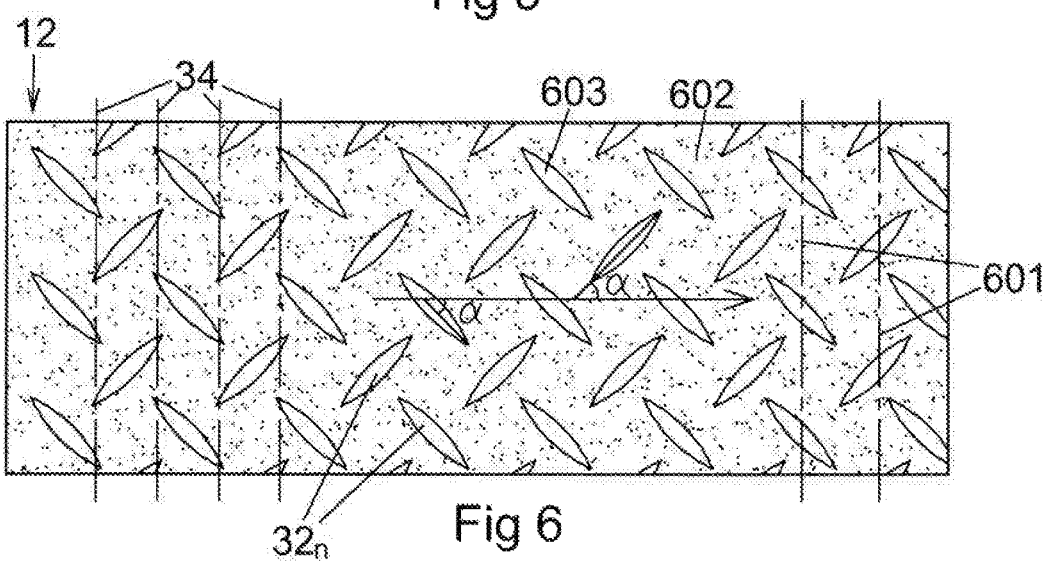
FIG. 6 shows a part of a mat according to the embodiment in FIG. 3.

FIG. 6 shows a mat 12 according to FIG. 3 with the lines 34 in which the greater bending of the mat takes place in the rolling of the mat over the drive roller. Halfway between these lines, the bending is the smallest and is shown in the figure by the dash-dotted lines 601. The support layer of the mat is, across a major part of the surface thereof, formed with first slip-reducing means 602, which correspond to the slip-reducing means according to the embodiment in FIG. 5. The wear layer of the mat having second slip-reducing means consists of a number of elevations $32_n$ each one of which has a length extension and an orientation across the mat according to a certain pattern, which in the embodiment illustrated forms an angle α with the direction of motion of the mat, which is shown by the arrow in the figure and which angle is 45°. These elevations in the mat also act as second slip-reducing means 603. As is seen in the figure, the pattern is formed with alternating angles of ±45° of the elevations with the purpose of obtaining an increased slip reduction of the wear layer. In addition, this embodiment shows that the available area of the support layer for the extremities of an animal is greater than the available area of the wear layer and therefore the first slip-reducing means are placed on the support layer.

Figure 7:
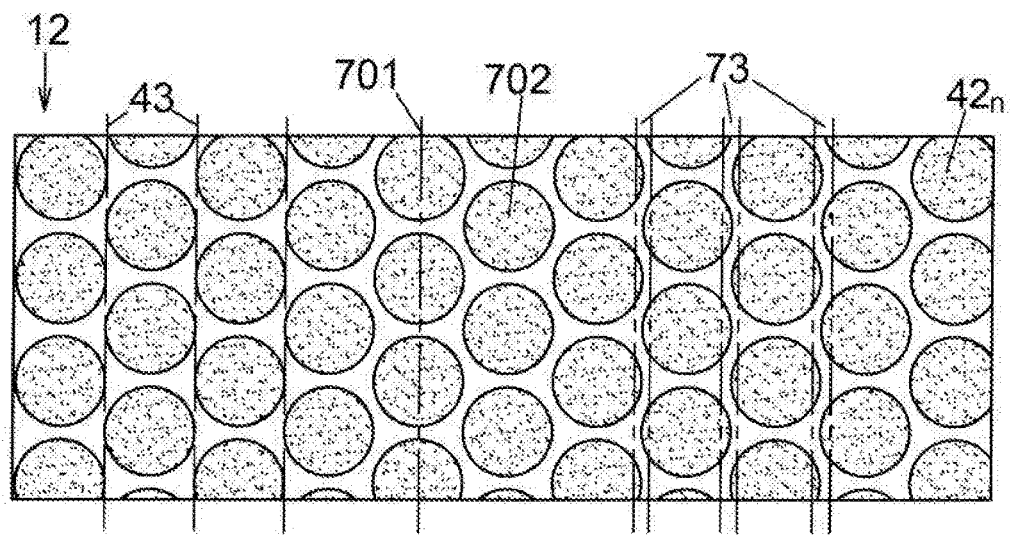
FIG. 7 shows a part of a mat according to the embodiment in FIG. 4

FIG. 7 shows a mat 12 according to FIG. 4 with the lines 43 in which the greater bending of the mat takes place in the rolling of the mat over the drive roller. Also bands 73 can be identified in which the bending is considerably greater than halfway between these bands and lines. Halfway between the bands/lines, the bending is the smallest and is shown in the figure by the dash-dotted lines 701. The wear layer of the mat is, across a major part of the surface thereof, formed with first slip-reducing means 702, which correspond to the slip-reducing means according to the embodiment in FIG. 5 and placed on the surface of the wear layer. In this embodiment, the wear layer comprises circular-cylindrical elevations having an upper curved surface according to FIG. 4, but this curved surface may alternatively be entirely flat, however comprising said first slip-reducing means 702. This embodiment shows that the available area of the wear layer is greater than the available area of the support layer and therefore the first slip-reducing means are placed on the wear layer.

Figure 8:
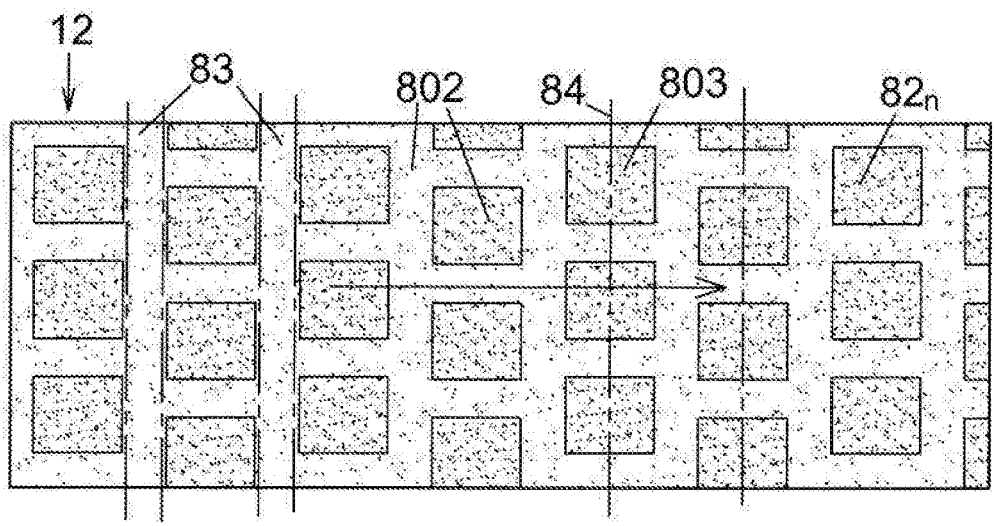
FIG. 8 shows an alternative embodiment of a mat according to the invention.

FIG. 8 shows an alternative design of a mat 12 according to the invention, which mat is formed with second slip-reducing means in the form of rectangular elevations $82_n$ placed according to a pattern wherein transverse bands 83 are formed in which the bending is greater than by the side of these bands, for instance along the line 84. The elevations are furthermore oriented parallel to the direction of motion of the mat according to the arrow. This embodiment shows that the available area of the wear layer is slightly greater than the available area of the support layer and therefore first slip-reducing means 802 are placed on both the support layer and the wear layer. The rectangular elevations also act as second slip-reducing means 803.

Figure 9:
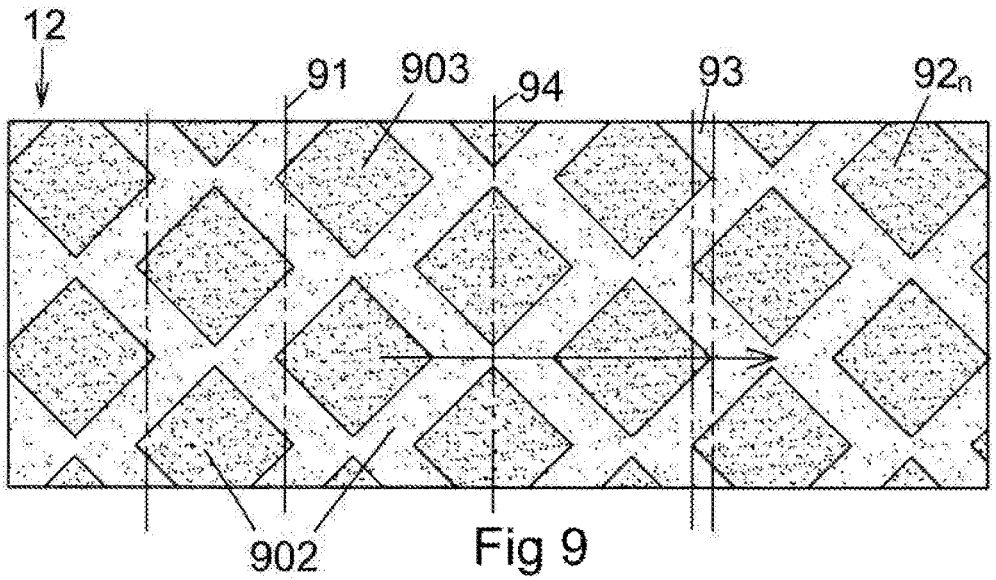
FIG. 9 shows an alternative embodiment of a mat according to the invention.

FIG. 9 shows an additional, alternative design of a mat 12 according to the invention. The mat is formed with quadratic elevations $92_n$ placed according to a pattern wherein transverse lines 91 or transverse bands 93 are formed in which the bending is greater than by the side of these bands, for instance along the line 94. The elevations are oriented at an angle that is 45° in relation to the direction of motion of the mat according to the arrow. Also in this embodiment, the wear layer and the support layer are formed with first slip-reducing means 902. The quadratic elevations also act as second slip-reducing means 903.

Within the scope of the invention, more layers than those shown may constitute the structure of the mat, for instance, a friction layer may be combined with a reinforcement layer to define the support layer which, together with an abrasion layer, is combined with one or more slip-eliminating layers into a wear layer. Such layers may be vulcanized together into a homogeneous mat.

Common to all embodiments is accordingly that the liquid-impervious mat possesses a greater bending in lines, grooves, or bands than by the side of these lines, grooves, or bands.

Common to all embodiments is in addition that the mat is provided with one or more types of slip-reducing structures placed on each other, by the side of each other, or a combination thereof.

Common to all embodiments is also that the mat is intended to be used in an intermittently movable floor for livestock facilities having material properties which resist the abrasion and the wear which are present in these environments.

The invention claimed is:

1. A floor assembly for livestock facilities, the floor assembly formed with a defined longitudinal direction, the floor assembly comprising:
    a cylindrical object having a diameter of $\emptyset=2R_o$;
    a mat formed as a closed loop and adapted to be bent intermittently about the cylindrical object, the mat comprising:
        a liquid-impermeable support layer;
        a wear layer applied to or integrated with the support layer;
        slip-reducing means positioned on or integrated with the wear layer; and
        a plurality of straight and parallel lines, grooves, or bands extending in a transverse direction of the mat; and;
    wherein the lines, grooves, or bands possess a lower flexural stiffness than the remainder of the mat in such a way that, when the mat is intermittently bent about the cylindrical object, a radius of bending r is obtained at the lines, grooves or bands that is shorter than a radius of bending $R_m$ of the remainder of the mat with an overall radius of bending of the mat about the cylindrical object equal to $R_o$.

2. The floor assembly according to claim 1, wherein the lines, grooves, or bands are oriented substantially perpendicular to a longitudinal direction of the mat.

3. The floor assembly according to claim 1, wherein the slip-reducing means comprises first slip-reducing means, wherein the wear layer is provided with the first slip-reducing means.

4. The floor assembly according to claim 1, wherein the slip-reducing means comprises second slip-reducing means, wherein the wear layer is provided with the second slip-reducing means; and wherein the lines, grooves, or bands can be identified between the second slip-reducing means.

5. The floor assembly according to claim 4, wherein the lines, grooves, or bands are indicated as material reductions of the second slip-reducing means on the mat.

6. The floor assembly according to claim 4, wherein the second slip-reducing means consist of elevations on the wear layer of the mat.

7. The floor assembly according to claim 6, wherein the second slip-reducing means are shaped according to a repeating pattern.

8. The floor assembly according to claim 7, wherein the repeating pattern consists of elongate elevations alternately oriented at angles of ±45° in relation to the longitudinal direction of the mat.

9. The floor assembly according to claim 1, wherein the bending of the mat is smallest half-way between adjacent lines, grooves, or bands.

* * * * *